3,637,882
ISOMERIZATION OF HYDRINDACENES
Ronald D. Bushick, Glen Mills, Pa., assignor to
Sun Oil Company, Philadelphia, Pa.
No Drawing. Filed Oct. 27, 1969, Ser. No. 869,868
Int. Cl. C07c 15/20
U.S. Cl. 260—668 F          10 Claims

ABSTRACT OF THE DISCLOSURE

The conversion of s-hydrindacene to as-hydrindacene, or the reverse conversion, is effected by contacting a feed rich in one of these isomers with HF—$BF_3$ or HF—$BCl_3$ to form the other isomer by isomerization. These isomers are useful as intermediates for the preparation of benzene tetracarboxylic acids or their anhydrides, which products have known utility as monomers in polymer manufacture.

BACKGROUND OF THE INVENTION

This invention relates to a method for isomerizing the symmetrical isomer of hydrindacene to the unsymmetrical isomer or vice versa.

The two possible isomers of hydrindacene have the following structural formulas:

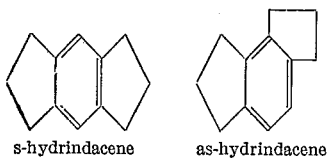

s-hydrindacene          as-hydrindacene

Each of these isomers can be oxidized in known manner, e.g., by nitric acid oxidation, to form corresponding benzene tetracarboxylic acids or their anhydrides. Thus pyromellitic acid or its dianhydride can be obtained from s-hydrindacene, and prehnitic acid or its dianhydride can be produced from as-hydrindacene. These acids and anhydrides have known utility as monomers for polymer manufacture, for example, in the preparation of polyimides as described in W. M. Edwards U.S. Pat. 3,179,634, dated Apr. 20, 1965.

A method of preparing as-hydrindacene is described in R. D. Bushick U.S. Pat. 3,336,407, dated Aug. 15, 1967. This involves the disproportionation of indan utilizing HF—$BF_3$ or HF—$BCl_3$ as catalyst.

The preparation of s-hydrindacene has been described by Arnold and Barnes, J.A.C.S., 66, 960–964 (1944), who also refer to its conversion to pyromellitic acid by nitric acid oxidation. These authors also reported experiments in which s-hydrindacene was contacted with sulfuric acid or with $AlCl_3$. Isomerization of the s-hydrindacene to the unsymmetrical isomer did not occur in either case. When sulfuric acid was used, the only reaction product obtained was a tary material. In the case of $AlCl_3$ the authors indicate that no as-hydrindacene was formed but that the reaction caused formation of some products having both one and two new alkyl groups attached to the aromatic ring in addition to having the two original 5-membered rings symmetrically condensed with the aromatic ring. No specific identifications of these products were made.

SUMMARY OF THE INVENTION

The present invention provides a facile way of converting s-hydrindacene to the unsymmetrical isomer or as-hydrindacene to the symmetrical isomer. The method comprises contacting a feed rich in one of the isomers with liquid hydrogen fluoride in combination with boron trifluoride or boron trichloride at a temperature in the range of 0–150° C., whereby isomerization to the other isomer occurs, and thereafter recovering from the reaction mixture a product rich in said other isomer.

DESCRIPTION

In accordance with the invention, it has now been discovered that when liquid HF is used in combination with $BF_3$ or $BCl_3$, the resulting complex, unlike $AlCl_3$ or $H_2SO_4$, is an effective catalyst for isomerizing hydrindacenes. A feed rich in s-hydrindacene can readily be isomerized to the unsymmetrical isomer, and a feed rich in as-hydrindacene can be isomerized to the symmetrical isomer. By "rich" is meant that the feed contains the isomer in question in a proportion, relative to the other isomer, greater than the thermodynamic equilibrium proportion. At 70° C., for example, this equilibrium proportion is of the order of 76–81 parts of as-hydrindacene to 24–19 parts of s-hydrindacene. Thus, for this temperature level, a stock which rich in s-hydrindacene is one in which the symmetrical isomer constitutes more than about 24% of the total hydrindacene content, while one that is rich in as-hydrindacene is a stock in which this unsymmetrical isomer constitutes substantially more than 81% of the total hydrindacene content.

The present isomerization method is effected merely by contacting a hydrindacene feed rich in one of the isomers at a temperature in the range of 0–150° C. with the HF—$BF_3$ or HF—$BCl_3$ catalyst for a time to cause substantial isomerization. For purposes of description it will be assumed that the catalyst is HF—$BF_3$ but it is to be understood that HF—$BCl_3$ gives substantially equivalent results. Usually the contacting would be carried out for sufficient time to approach the equilibrium composition. The catalyst components are then separated from the hydrocarbon material as, for example, by distillation to recover same for reuse, and the two isomers in the product are separated from each other, for example, also by distillation. The unisomerized feed isomer so recovered can, if desired, be recycled for further conversion.

The HF should be employed in liquid phase. Although the reaction can be, and preferably is, carried out above the boiling point of HF (19.4° C.) the pressure in the reaction vessel should be sufficient to maintain the HF in liquid phase. All boiling points herein are at 760 mm. Hg absolute pressure unless otherwise stated. Normally the $BF_3$ (B.P.=—101° C.) pressure in the reaction vessel is sufficient to maintain the HF in liquid phase. If not other convenient means can be employed to insure the use of liquid HF, such as pressuring the reaction vessel with nitrogen, etc. The amount of HF employed should be at least 5 moles per mole of hydrindacene but is preferably at least 10 moles per mole. Preferably the HF: hydrindacene mole ratio does not exceed about 50:1, although ratios as high as 200:1 or even higher can be used if desired.

The proportion of $BF_3$ used should be at least 0.1 mole per mole of hydrindacene and is preferably at least 0.5 mole per mole. The best mole ratios of $BF_3$: hydrindacene to use are in the range of 0.5:1 to 2:1, although higher ratios such as 10:1 or 100:1 can be used if desired.

The temperature at which the reaction is carried out should be in the range of 0–150° C., preferably 25–100° C., and more preferably the temperature is about 40–80° C.

The reaction time can vary considerably and will depend largely upon the temperature selected for carrying out the isomerization. Typical reaction times are in the range of 0.1–3 hours. The reaction time and temperature are interrelated in that as the temperature increases the time required to obtain equivalent results decreases. Conversely, as the temperature decreases the time increases. Because of this it is impossbile to specify any single temperature or time as optimum. On the other hand, for any given time or temperature it is relatively easy to determine from a few experiments the optimum value of the other variable.

In order to facilitate contact between the hydrocarbon material and the acid phase, it is often desirable to employ a solvent for the hydrindacene. This is particularly so if a reaction temperature is to be used that is below the melting points of the isomers, such melting points being 52–54° C. for s-hydrindacene and 41–42° C. for as-hydrindacene. For this purpose inert hydrocarbon solvents such as n-paraffins are suitable. Examples of particularly suitable solvents are n-pentane, n-hexane, n-heptane or n-octane.

The reaction can be carried out in any convenient manner using equipment of conventional type. For example the hydrindacene starting material, with or without a solvent, is charged to a closed reaction vessel equipped with heating and agitation means. The required amount of HF is then added following which the HF-hydrindacene mixture is heated to the desired reaction temperature. Next the desired amount of $BF_3$ is added and the reaction mixture is then agitated in order to insure efficient contact of the HF—$BF_3$ catalyst with the hydrindacene. After adding the $BF_3$ the reaction mass is then maintained at the desired reaction temperature for the desired contact time to effect isomerization of the feed isomer and thereby form the other isomer.

At the end of the reaction period the catalyst materials are separated from the hydrocarbons and the isomeric hydrindacenes are fractionated to separate the isomers from each other. Procedures for separating the HF and $BF_3$ catalyst components from reaction mixtures are well known (see, for example, A. P. Lien et al. U.S. Pats. 2,662,926, dated Dec. 15, 1953 and 2,753,384, dated July 3, 1956) and need not be described here. For commercial practice the HF and $BF_3$ would be recovered and recycled for reuse, as also would be the hydrocarbon solvent when one is used. The preferred procedure for separating the hydrindacene isomers from each other is fractional distillation, inasmuch as the isomers have approximately the following boiling characteristics:

s-hydrindacene _____ 116–120° C. @ 9 mm. Hg abs.
as-hydrindacene _____ 124–128° C. @ 9 mm. Hg abs.

As alternative procedures fractional crystallization or selective adsorption can be used. After separation of the isomers, the recovered unisomerized feed isomer can be recycled for further treatment in accordance with the invention.

The examples given below specifically illustrate the invention. In Runs 1–5 the hydrindacene feed material is the symmetrical isomer in substantially pure form, while in Run 6 substantially pure as-hydrindacene is used. The procedure in each run is essentially the same and is as follows.

The reaction vessel is a small reactor equipped with a shaker and heating and cooling means. A solution of 0.5 g. of the hydrindacene isomer dissolved in 10 ml. of n-heptane is charged to the reactor and the solution is frozen by means of Dry Ice. The reactor is evacuated, following which the HF is drawn into it. The reactor is then shaken and heated to the desired reaction temperature, and the $BF_3$ is added. In all runs the $BF_3$ pressure is sufficient to maintain essentially all of the HF in liquid phase. The reactor is then held at the reaction temperature for the desired reaction time, the time being measured from the time of $BF_3$ addition. Shaking of the reactor continues throughout the entire reaction time. At the end of the reaction period the reactor is cooled to 15° C., opened, and the contents thereof quenched in ice. Two liquid layers result, an aqueous acid layer and an organic layer. This two-phase system is neutralized with $Na_2CO_3$ after which the organic layer is drawn off and washed several times with twice its volume of water. The organic layer is then analyzed by infrared spectroscopy.

The reaction conditions for the six runs and the compositions of the reaction products are shown in the accompanying table.

TABLE.—ISOMERIZATION OF HYDRINDACENES

| | | Molar ratios | | | | | Composition of product, mole percent | |
|---|---|---|---|---|---|---|---|---|
| Run No. | Isomer used | HF/ isomer | $BF_3$/ isomer | HF/$BF_3$ | Temp., °C. | Time, min. | S-hyd. | As-hyd. |
| 1 | S-hyd | 42.7 | 1.4 | 30.4 | 30 | 60 | 91 | 9 |
| 2 | S-hyd | 22.2 | 2.3 | 9.7 | 50 | 60 | 38 | 62 |
| 3 | S-hyd | 42.7 | 0.9 | 47.4 | 70 | 60 | 27 | 73 |
| 4 | S-hyd | 33.2 | 0.9 | 36.9 | 70 | 90 | 24 | 76 |
| 5 | S-hyd | 34.8 | 1.2 | 28.9 | 70 | 90 | 24 | 76 |
| 6 | As-hyd | 11.0 | 1.9 | 5.8 | 70 | 90 | 19 | 81 |

The tabulated results show that the HF—$BF_3$ catalyst is effective in isomerizing either isomer to the other. A comparison of Runs 1, 2 and 3 shows the effect of temperature on reaction rate. Runs 3, 4 and 5 show that at 70° C. the product approaches the equilibrium composition in a reaction time of one hour or so. Runs 4, 5 and 6 indicate that the equilibrium composition at this temperature level corresponds to about 76–81% of the unsymmetrical isomer.

Substantially equivalent results are obtained when $BCl_3$ is substituted for $BF_3$.

The invention claimed is:

1. Method of converting s-hydrindacene to its isomer, as-hydrindacene, or as-hydrindacene to its isomer, s-hydrindacene, which comprises contacting a feed consisting essentially of hydrindacene material rich in one of the said isomers with liquid HF in combination with $BF_3$ or $BCl_3$ at a temperature in the range of 0–150° C., whereby isomerization of the contacted isomer to the other isomer occurs, and recovering from the reaction mixture a product rich in said other isomer.

2. Method according to claim 1 wherein after recovery of said other isomer the unconverted feed isomer is recycled for further contacting in the manner specified.

3. Method according to claim 1 wherein s-hydrindacene is the feed isomer and a product rich in as-hydrindacene is recovered from the reaction mixture.

4. Method according to claim 3 wherein the temperature is in the range of 25–100° C.

5. Method according to claim 4 wherein the molar ratio of HF to feed isomer is at least 5 and the molar ratio of BF$_3$ to feed isomer is at least 0.1.

6. Method according to claim 5 wherein said ratios are, respectively, at least 10 and at least 0.5.

7. Method according to claim 1 wherein as-hydrindacene is the feed isomer and a product rich in s-hydrindacene is recovered from the reaction mixture.

8. Method according to claim 7 wherein the temperature is in the range of 25–100° C.

9. Method according to claim 8 wherein the molar ratio of HF to feed isomer is at least 5 and the molar ratio of BF$_3$ to feed isomer is at least 0.1.

10. Method according to claim 9 wherein said ratios are, respectively, at least 10 and at least 0.5.

References Cited

UNITED STATES PATENTS 3,336,407   8/1967   Bushick _____ 260—668 F

DELBERT E. GANTZ, Primary Examiner

V. O'KEEFE, Assistant Examiner

U.S. Cl. X.R.

260—666 PY